United States Patent [19]
Williams et al.

[11] Patent Number: 5,422,745
[45] Date of Patent: Jun. 6, 1995

[54] PREPARATION OF PERMANENT PHOTOWRITTEN OPTICAL DIFFRACTION GRATINGS IN IRRADIATED GLASSES

[75] Inventors: Glen M. Williams, Alexandria, Va.; David A. Dutt, Irwin, Pa.; Jacqueline A. Ruller, Alexandria, Va.; Edward J. Friebele, Cheverly, Md.

[73] Assignee: The United States of America as represented by the Secretary of the Navy, Washington, D.C.

[21] Appl. No.: 968,872

[22] Filed: Oct. 30, 1992

[51] Int. Cl.⁶ .................... G03N 1/02; G02B 5/18
[52] U.S. Cl. ........................ 359/3; 359/569; 430/2; 378/70
[58] Field of Search .................. 359/1, 3, 4, 6, 7, 569, 359/900, 34; 430/1, 2; 378/36, 70; 385/37

[56] References Cited

U.S. PATENT DOCUMENTS 4,390,637 6/1983 Daiku .................... 501/64
4,728,165 3/1986 Powell et al. .................... 359/7

OTHER PUBLICATIONS

Vorozheikina et al. Hologram Recording in Irradiated KBr Crystals By a Laser Beam, Sov. Tech. Phys. Lett. 5(9), Sep. 1979 pp. 473–474.
Ascheulov et al., Activated Photochromic Glass As Three Dimensional Holographic Media, Opt. & Spectrosc., vol. 30, No. 6, Jun. 1971 pp. 612–614.
Durville et al., "Laser-induced refractive-index gratings in Eu-doped glasses", Physical Rev. B 34 (6) 4213–20 (Sep. 15, 1986).
Behrens et al., "Observation of erasable holographic gratings at room temperature in $Eu^{3+}$-doped glasses", Optics Letters 11 (10) 653–55 (Oct. 1986).
Behrens et al., "Characteristics of laser-induced gratings in $Pr^{3+}$- and $Eu^{3+}$-doped silicate glasses", J. Optical Soc'Y Am. B 7 (8) 1437–44 (Aug. 1990).
Williams et al., "Permanent photowritten optical gratings in irradiated silicate glasses", Optics Letters 17 (7) 532–34 (Apr. 1, 1992).
Meltz et al., "Formation of Bragg gratings in optical fibers by a transverse holographic method", Optics Letters 14(15) 823–25 (Aug. 1, 1989).

*Primary Examiner*—Loha Ben
*Assistant Examiner*—Darryl J. Collins
*Attorney, Agent, or Firm*—Thomas E. McDonnell; John J. Karasek

[57] ABSTRACT

A fast process for photowriting a permanent, high efficiency optical grating comprises darkening glass by irradiation and photobleaching the darkened glass by exposing the glass to interfering writing laser beams, thereby forming the grating.

18 Claims, 3 Drawing Sheets

PREPARATION OF PERMANENT PHOTOWRITTEN OPTICAL DIFFRACTION GRATINGS IN IRRADIATED GLASSES

BACKGROUND OF THE INVENTION

1. Field of the Invention

This invention relates to improved materials and processes for photowriting optical diffraction gratings into glasses. More particularly, this invention relates to fast processes for photowriting permanent high efficiency optical gratings by exposing glasses previously darkened by high energy radiation to interfering writing laser beams to photobleach these gratings into the glasses.

2. Description of the Related Art

Optical diffraction gratings, both in fiber and bulk form, are finding their way into an ever-growing number of applications, including communications systems, strain sensing systems, and optical processing and computing systems.

Generally speaking, the effectiveness of an optical grating is measured by its peak-to-valley index modulation ($\Delta n$), or by its scattering efficiency ($\eta$). The refractive $\Delta n$ is related to $\eta$ by the expression:

$$\Delta n = (1/\pi)(\lambda/l)(\eta)^{\frac{1}{2}}$$

where $l$ is the sample thickness and $\lambda$ is the wavelength of the probe light.

Optical gratings in glasses are most typically laser-induced, i.e. photowritten into glasses by interfering laser beams. See, e.g., Durville et al., "Laser-induced refractive-index gratings in Eu-doped glasses", *Physical Rev.* B 34 (6) (Sep. 15, 1986), which is incorporated by reference herein.

This method is slow; a typical grating requires anywhere from several minutes to several dozen minutes to write using this method. The gratings produced by this method are not particularly strong; peak-to-valley index modulations ($\Delta n$) of about $5 \times 10^{-7}$ are typical, as noted above.

It has been demonstrated that stronger gratings ($\Delta n$ on the order of $3 \times 10^{-5}$) can be written in germanosilicate glasses. See Meltz et al., "Formation of Bragg gratings in optical fibers by a transverse holographic method", *Optics Letters* 14 (15) pp. 823–25 (Aug. 1, 1989). However, Meltz et al. achieve this high $\Delta n$ by using a large, expensive (several hundred thousand dollars), high-power (with instantaneous beam intensities on the order of $10^7$ W/cm$^2$), high energy ($\lambda$ on the order of 244 nm) doubled excimer-pumped dye laser. This dye laser system was used as a work-around to the notoriously poor beam quality inherent in excimer lasers.

It is desired to make high $\Delta n$ gratings using small, inexpensive, low power, continuous wave visible-light lasers with high beam quality (i.e. high transverse and longitudinal coherence), such as argon lasers. It is also desired to make gratings with high $\Delta n$ in glasses other than germanosilicate. In particular, it is desired to make gratings with high $\Delta n$ in a broad range of silicate glasses (a silicate glass is defined herein to be any glass where silica is the predominant glass former).

SUMMARY OF THE INVENTION

Accordingly, it is an object of this invention to write permanent diffraction gratings with high index modulations in a variety of glasses.

It is a further object of this invention to write these gratings with a fast process, using low power visible-light lasers.

These and additional objects of the invention are accomplished by the structures and processes hereinafter described.

A permanent optical grating is written by irradiating a glass with a high energy source, to darken the glass and change its index of refraction. The darkened glass is then exposed to interfering write beams, which photobleach the darkened glass, thereby forming the grating.

BRIEF DESCRIPTION OF THE DRAWINGS

A more complete appreciation of the invention will be readily obtained by reference to the following Description of the Preferred Embodiments and the accompanying drawings in which like numerals in different figures represent the same structures or elements, wherein.

DESCRIPTION OF THE PREFERRED EMBODIMENTS

A change in the coloration (i.e. absorption) of a glass is accompanied by a change in refractive index. Because changes in coloration are simpler to measure than index changes, the effect of various process steps sometimes will be described here in terms of changes in the coloration of the glass sample 12. Thus it should be remembered that glass coloration changes are noted here as an indicator of changes to the glass's refractive index (n).

In the process of this invention, the glass sample 12 is pretreated by uniformly irradiating it to darken and change the index of refraction (n) of the sample 12. The type of radiation used for this pretreatment will depend upon the glass selected. For example, some glasses (e.g. undoped silicates) can be darkened only with high energy radiation such as x-rays or $\gamma$-rays. Other glasses (e.g. praseodymium-doped silicates) can be darkened with UV laser light. See generally Williams et al., "Permanent photowritten optical gratings in irradiated silicate glasses", *Optics Letters* 17 (7) pp. 532–34, which is incorporated by reference herein.

Preferably, a sufficient dose of darkening radiation is applied to the sample 12 to significantly darken it, so that the subsequent writing step can likewise significantly photobleach the sample 12, resulting in a large index modulation ($\Delta n$) for the grating. Typically, the glass is irradiated with between about 0.5 Mrad and about 2.0 Mrad (Si standardized) of darkening radiation. Preferably, the sample 12 is darkened to saturation, i.e. until further irradiation does not darken the sample 12 significantly.

Figure 1:
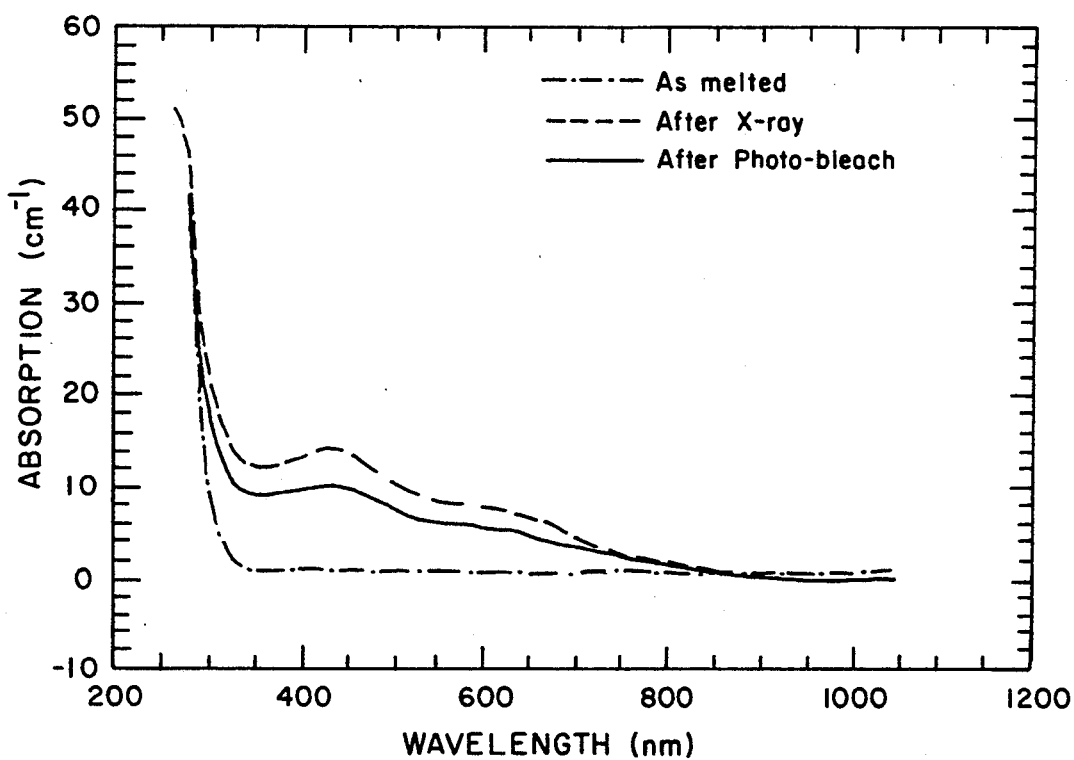
FIG. 1 shows the absorption spectrum of a simple silicate glass at various stages of the process.
Figure 2:
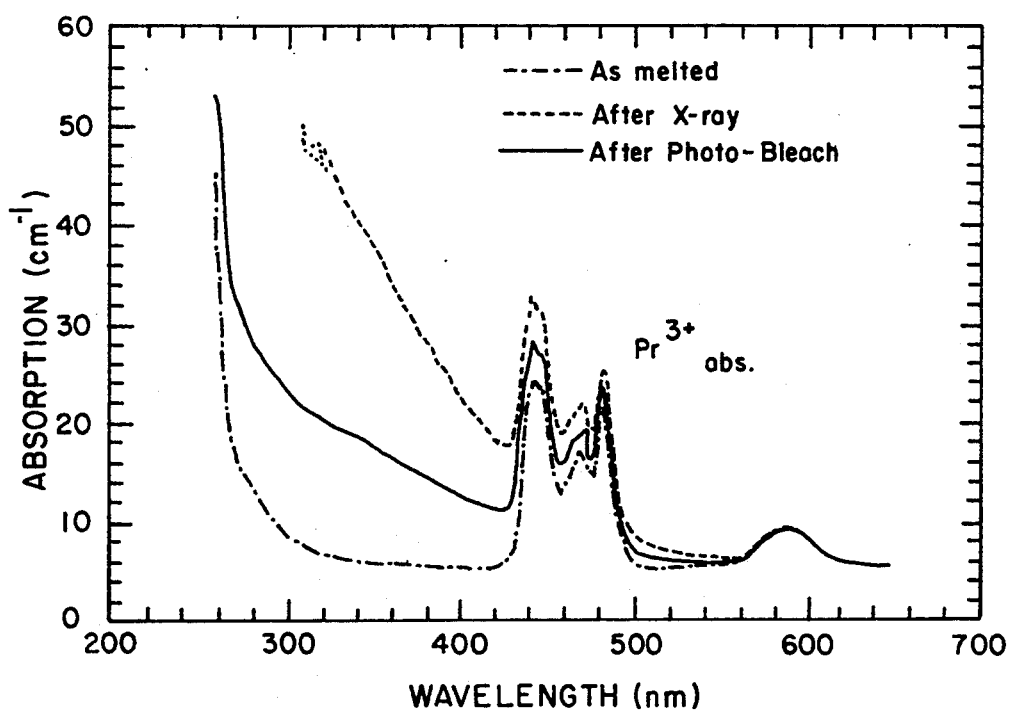
FIG. 2 shows the absorption spectrum of a Pr-doped silicate glass at various stages of the process.

As shown in FIGS. 1 and 2, this pretreatment increases the absorption of the sample 12 across a portion of the spectrum. This increase in the absorption varies from glass to glass, as illustrated by the differences in the "After X-ray" curves in FIGS. 1 and 2.

The darkening radiation should have energy of at least about $h\nu=5$ eV. Preferably, this darkening radiation is high energy x- or $\gamma$-radiation. Most preferably, the darkening radiation has energy of at least about $h\nu=50$ keV. It is anticipated that this radiation will be sufficiently energetic to darken most glasses.

As further shown in FIGS. 1 and 2, exposing the pretreated sample 12 to the photobleaching light reduces the absorption of the sample 12 across a portion of the spectrum. This decrease in the absorption also varies from glass to glass, as illustrated by the differences in the "After Photo-Bleach" curves in FIGS. 1 and 2. The efficiency of a grating at a particular wavelength is a function of the absorption spectrum, governed by a Kramers-Kronig relationship. Consequently, it is anticipated that the selection of a particular glass will be determined in part by the wavelength of the light to be used in the particular application. Other factors influencing the selection of the glass are the $\Delta n$ desired, the write wavelength to be used, and the read wavelength to be used.

Figure 3:
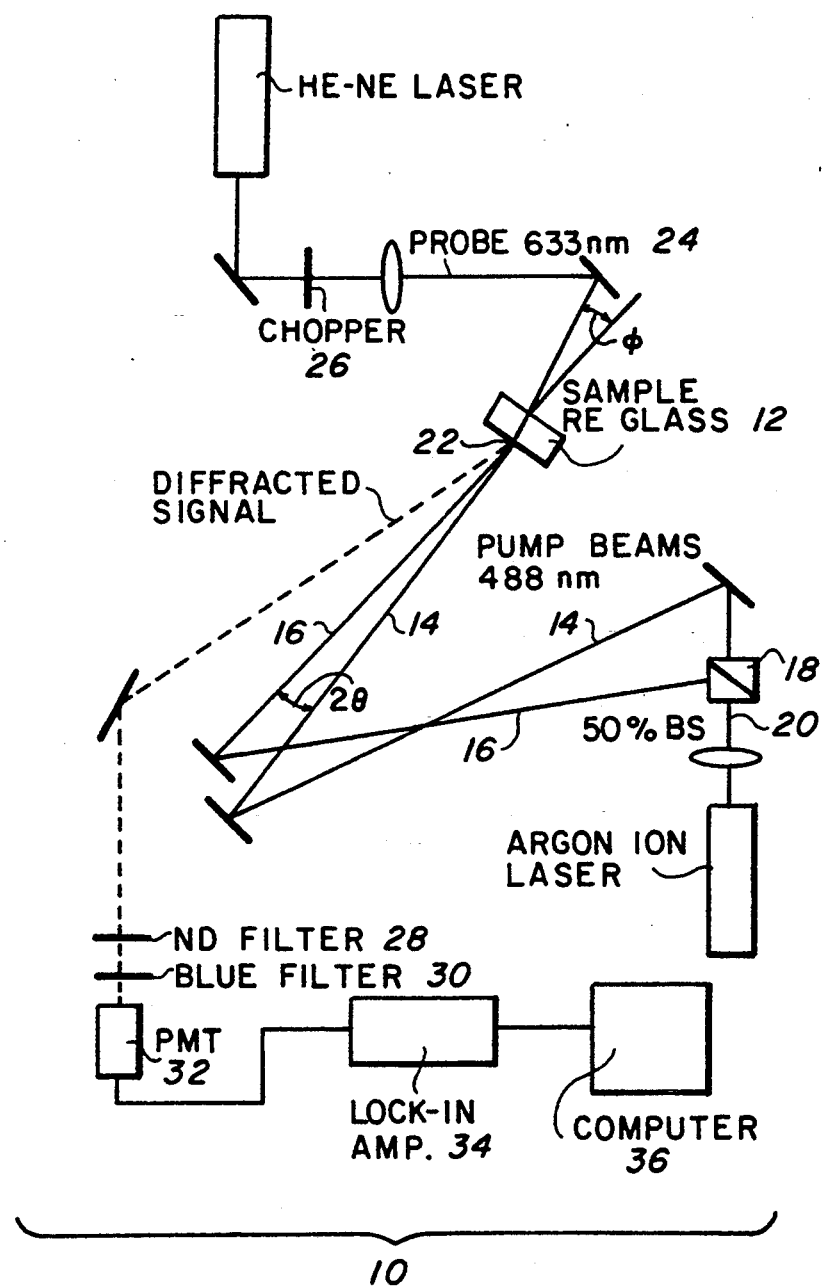
FIG. 3 shows a preferred setup for photobleaching an irradiated glass sample.

As shown in FIG. 3, the grating is formed by exposing the pretreated sample 12 to a pair of intersecting, interfering laser beams 14,16 of essentially equal intensity and wavelength. These laser beams 14,16 have wavelengths in the green (about 515 nm) to ultraviolet (about 200 nm) portion of the spectrum. The interfering laser beams 14,16 are preferably formed by dividing, with a beamsplitter 18, a writing laser beam 20 into two beams 14,16 of essentially equal intensity. These two beams 14,16 are intersected with each other to form an interference pattern, with path length differences of at most the coherence length of the writing laser 20. Preferably, the writing laser 20 is a blue-green laser. Most preferably, the writing laser 20 is an argon laser. These lasers are compact, inexpensive, and have good beam quality.

The sample 12 is positioned at the intersection point 22 of the two beams 14,16. The grating forms as the interfering beams 14,16 photobleach the darkened glass. The period $\Lambda$ of the resulting grating is controlled by adjusting the angle between the intersecting write beams 14,16. Gratings with $\Lambda$ less than 15 $\mu$m can be formed by this method.

The sample 12 may be tested in situ, in real time as the grating is written. Preferably, the sample 12 is probed with a chopped He—Ne laser beam 24, with the probe beam incident at the Bragg angle for the sample 12.

In a preferred embodiment of the invention, the treated glass is a silicate glass. Preferably, this glass is doped with not more than about 15 mol % of a rare earth element, or a compound of a rare earth element. More preferably, the glass is doped with not more than about 10 mol % of a rare earth element or compound of a rare earth element. Most preferably, the rare earth element dopant is praseodymium.

It is anticipated that gratings made according to this method will reach saturation (i.e. further writing does not significantly increase $\Delta n$) in no more than 60 seconds in most cases and in no more than 120 seconds in almost all cases, when writing with a typical argon laser or its equivalent. It is further anticipated that gratings made according to this method will have values for $\Delta n$ of at least $1.0 \times 10^{-5}$ in most cases and at least $0.5 \times 10^{-5}$ in almost all cases.

Having described the invention, the following examples are given to illustrate specific applications of the invention, including the best mode now known to perform the invention. These specific examples are not intended to limit the scope of the invention described in this application.

EXAMPLES

Comparative Example 1

Non-formation of a Grating in Non-Irradiated Silicate

A silicate glass was prepared with the composition 75 mol % $SiO_2$, 15 mol % $Na_2O$, 5 mol % BaO, and 5 mol % ZnO. A 2 mm thick sample 12 was cut and polished from this glass.

The apparatus 10 shown in FIG. 3 was assembled. The sample 12 was positioned in the apparatus 10 as shown. The writing laser was a reconditioned Spectra Physics model 164 argon ion laser operating at 488 nm. The write beam 20 was split into 2 beams 14,16 of equal intensity (200 W/cm² combined intensity) with a 50% beamsplitter 18. The writing beams were directed to intersect at the sample position, with the bisector of the two write beams normal to the sample. The angle between the two write beams (the write angle, 2 $\theta$) was 1.7°. The sample 12 was exposed to the writing beams 14,16 for about 30 minutes.

The source of the probe beam 24 was a Oriel model 79308 10 mW He—Ne laser operating at 632.8 nm. The probe laser was chopped with a chopper 26, to facilitate measurement of the diffracted probe signal 24, and was positioned to strike the sample 12 at a measured angle of $\phi=1°$ (the calculated Bragg angle was 1.08°, according to the equation $\sin \phi = \sin \theta \, (\lambda_p/\lambda_w)$, where $\theta$ is the incident angle for the write beams, measured from normal, and where $\lambda_p$ and $\lambda_w$ are the probe and write beam wavelengths, respectively). The diffracted signal was monitored by a Hamamatsu model R2027 photo-multiplier tube (PMT) 32 filtered with a blue filter 30 (90% transmission at 632 nm, less than 1% transmission from 514 to 459.7 nm, to remove noise light) and an adjustable neutral density filter 28 which was adjusted to keep the signal measured by the PMT 32 within the linear response region of the PMT 32. The PMT signal was passed through a Princeton Applied Research model 5206 Lock-in amp 34 synchronized with the chopper 26 to measure the diffracted signal from the probe 24. The signal from the Lock-in amp 34 was input to a computer 36 for data collection and analysis.

No grating formation was observed for this sample 12.

Comparative Example 2

Slow Formation of a Grating in Non-Irradiated Pr-doped Silicate

A Pr-doped silicate glass was prepared with the composition 74 mol % $SiO_2$, 15 mol % $Na_2O$, 5 mol % BaO, 5 mol % ZnO, and 1 mol % $Pr_6O_{11}$. A 1 mm thick sample 12 was cut and polished from this glass. The sample 12 was mounted as in Example 1.

The writing beams 14,16 had a combined intensity of 200 W/cm². The write angle 2 $\theta$ was 2.1°. The probe angle $\phi$ was 1.4°.

This procedure resulted in a grating with $\Delta n$ of about $5 \times 10^{-7}$. The initial $\Delta n/\Delta t$ was $5.5 \times 10^{-4} s^{-1}$. The sample 12 reached saturation after about 30 minutes.

This example was repeated for glass samples with the compositions (75-x) mol % $SiO_2$, 15 mol % $Na_2O$, 5 mol % BaO, 5 mol % ZnO, and x mol % $Pr_6O_{11}$, where $x=2$ and 5. The highest values for $\Delta n$ were achieved for samples with 74 mol % $SiO_2$ and 1 mol % $Pr_6O_{11}$.

Comparative Examples 1 and 2 demonstrate the limitations of attempting to write gratings in a variety of non-irradiated silicate glasses. Gratings were not formed for all glasses. For those glasses that did result in grating formation, photoefficiency was low and the resultant gratings were not particularly strong.

Example 1

Formation of a Grating in X-ray Treated Silicate

A 2 mm thick glass sample 12 was prepared as in Comparative Example 1, with the composition 75 mol % $SiO_2$, 15 mol % $Na_2O$, 5 mol % BaO, and 5 mol % ZnO. This sample 12 was treated with 1 Mrad of 100 keV X-rays (Si standardized) from a Seifert Isovolt 150 X-ray machine, visibly darkening the glass.

Figure 4:
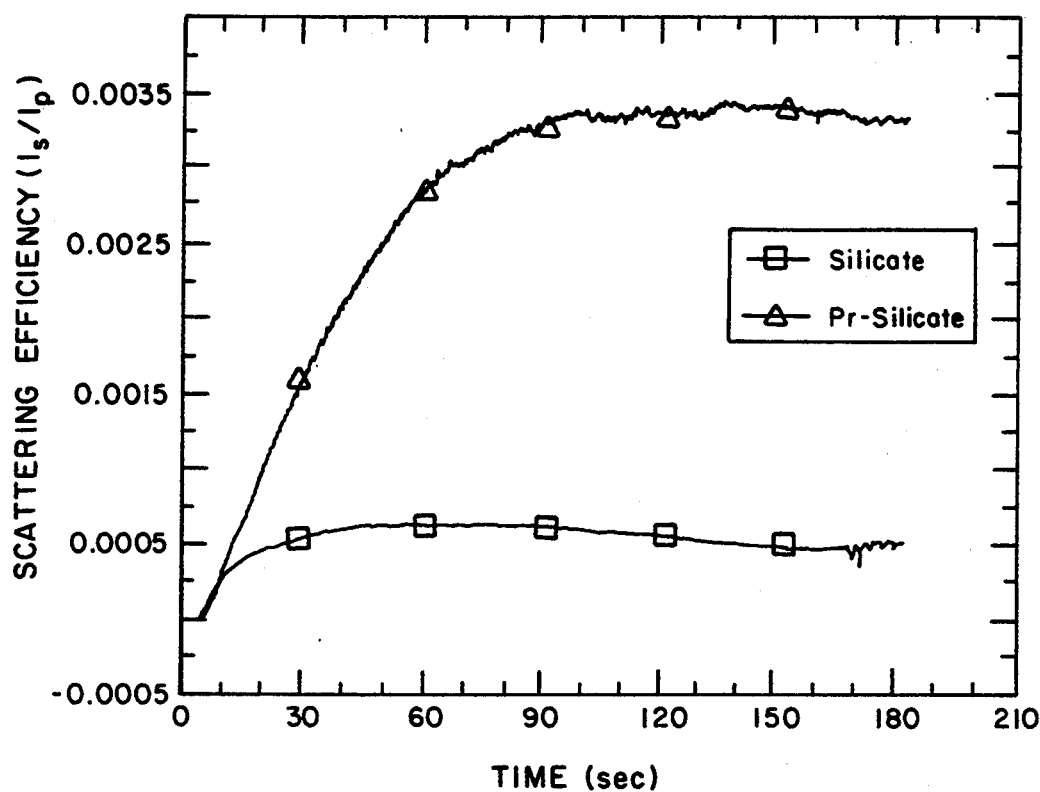
FIG. 4 shows the scattering efficiency as a function of write time for X-ray treated glasses.

The sample 12 was mounted and probed as in Comparative Example 2. The sample 12 was written for about 30 seconds with interfering 488 nm write beams 14,16, with a combined intensity of 100 W/cm². The sample 12 reached saturation in about 30 seconds. The resulting grating had $\Delta n = 2.7 \times 10^{-6}$. Results are shown in FIG. 4.

Example 2

Formation of a Grating in X-ray Treated Pr-doped Silicate

A 2 mm thick glass sample 12 was prepared as in Comparative Example 1. The composition of this glass was 70 mol % $SiO_2$, 15 mol % $Na_2O$, 5 mol % BaO, 5 mol % ZnO, and 5 mol % $Pr_6O_{11}$. The sample was irradiated as in Example 1. The sample was mounted, written, and probed as in Comparative Example 2. The sample 12 reached saturation in about 30 seconds. The resulting grating had $\Delta n = 7.0 \times 10^{-6}$. Results are shown in FIG. 4.

Example 3

Formation of a Grating in γ-ray Treated Silicate

A 2 m thick glass sample 12 was prepared as in Comparative Example 1, with the same composition as Comparative Example 1. The sample 12 was treated with 1 Mrad of 1 MeV γ-rays from a $^{60}$Co source, visibly darkening the sample 12. The sample 12 was mounted, written, and probed as in Comparative Example 2. The sample 12 reached saturation in about 30 seconds. The resulting grating had $\Delta n = 4.6 \times 10^{-6}$.

Example 4

Formation of a Grating in γ-ray Treated Pr-doped Silicate

A 1 mm thick glass sample 12 was prepared as in Comparative Example 2. The sample 12 was irradiated as in Example 3. The sample 12 was mounted and probed as in Example 2. The sample 12 was written as in Comparative Example 2, and reached saturation in about 30 seconds. The resulting grating had $\Delta n = 1 \times 10^{-5}$.

Different write wavelengths were used to prepare gratings in γ-ray treated Pr-doped silicate. The relative efficiencies of these write wavelengths are listed below:

| λ(write) | $\Delta n_{sat}$ | $(\Delta n/\Delta t)_{initial}$ |
| --- | --- | --- |
| 514.5 nm | 0.75 | 2.2 |
| 488 | 1.00 | 1.0 |
| 459.7 | 1.13 | 0.2 |

Example 5

Darkening of a Pr-doped Silicate Treated with 5 eV Laser Light

A 400 μm thick glass sample 12 was prepared as in Example 2. The composition of this glass was 70 mol % $SiO_2$, 15 mol % $Na_2O$, 5 mol % BaO, 5 mol % ZnO, and 5 mol % $Pr_6O_{11}$. The sample 12 was treated with approximately 1,000 laser shots from a 5 eV (248 nm) KrF excimer laser. Each laser shot had a fluence of 50 mJ/cm² and a duration of about 20 nsec. The repetition rate for these laser shots was 10 Hz. The sample 12 was visibly darkened by this treatment. The laser light was not used to prepare the glasses for grating writing experiments because of the very short penetration depth of the 248 nm light into the glass samples. The change in the absorbance as a function of the number of shots is shown below:

| # of shots | $\Delta \alpha$ (cm$^{-1}$) @ 300 nm |
| --- | --- |
| 200 | 11.5 |
| 600 | 16.0 |
| 6,000 | 22.0 |
| 18,000 | 23.0 |

Example 6

Anneal Testing of Photowritten Gratings for Permanence

Figure 5:
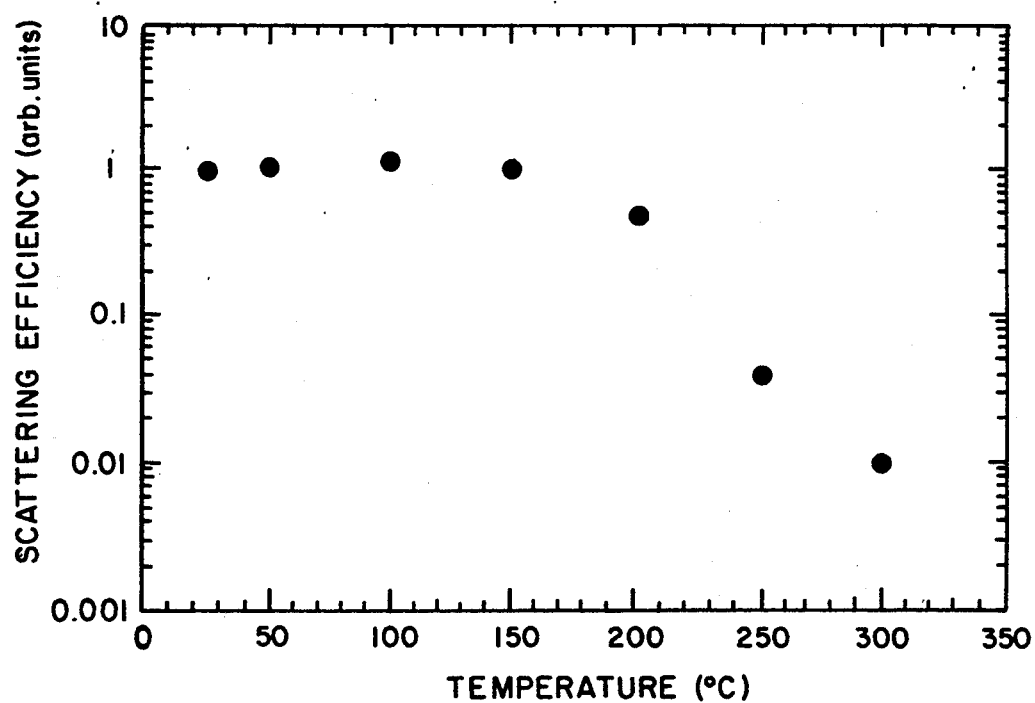
FIG. 5 shows the temperature dependence of the scattering efficiency for a grating in a Pr-doped silicate.

A 2 mm thick glass sample was prepared and irradiated as in Example 4. A grating was written into this sample with write beams having a combined intensity of 200 W/cm² writing at an angle of $2\theta = 1.7°$. The grating was subjected to heat treatments of progressively higher temperature. Each heat treatment lasted for approximately five minutes. The grating scattering efficiency was measured after each heat treatment. The grating was stable up to approximately 150° C. Annealing results are shown in FIG. 5. Additionally, it was observed that holding this grating at room temperature for 36 hours did not affect the scattering efficiency of the grating. This demonstrates the permanence of these gratings at and above room temperature.

Obviously, many modifications and variations of the present invention are possible in light of the above teachings. It is therefore to be understood that, within the scope of the appended claims, the invention may be practiced otherwise than as specifically described.

What is claimed is:

1. A process for photowriting a diffraction grating into a glass, comprising:
   a) exposing the glass to a quantity of electromagnetic radiation to darken said glass, wherein said electromagnetic radiation has energy of at least about $h\nu = 5$ eV, and
   b) exposing said irradiated glass to interfering light beams of essentially equal wavelength and intensity, to selectively bleach said darkened glass, thereby forming the grating.

2. The process of claim 1, wherein the glass is a silicate glass.

3. The process of claim 2, wherein the silicate glass is doped with at most about 15 mol % of a rare earth element or compound of said rare earth element.

4. The process of claim 3, wherein said rare earth element is praseodymium.

5. The process of claim 1, wherein said electromagnetic radiation has energy of at least about $h\nu = 50$ keV.

6. The process of claim 1, wherein said quantity of electromagnetic radiation is between about 0.5 Mrad and about 2.0 Mrad.

7. The process of claim 1, wherein said quantity of electromagnetic radiation is about 1.0 Mrad.

8. The process of claim 1, wherein said quantity of electromagnetic radiation darkens the glass to saturation.

9. The process of claim 1, wherein the glass is a optical fiber.

10. The process of claim 1, wherein said grating has a peak-to-valley $\Delta n$ of at least about $0.5 \times 10^{-5}$.

11. The process of claim 1, wherein said grating has a peak-to-valley $\Delta n$ of at least about $1.0 \times 10^{-5}$.

12. The process of claim 1, wherein said interfering light beams saturate said darkened glass, thereby forming said grating, in at most about 120 seconds.

13. The process of claim 1, wherein said interfering light beams saturate said darkened glass, thereby forming said grating, in at most about 60 seconds.

14. The process of claim 1, wherein said interfering light beams have wavelengths of at most about 514 nm.

15. The process of claim 1, wherein said interfering light beams have wavelengths of between about 490 nm and about 400 nm.

16. The process of claim 1, wherein said interfering light beams have wavelengths of about 488 nm.

17. The process of claim 1, wherein said interfering light beams have output powers of between about 5 W/cm$^2$ and about 75 W/cm$^2$.

18. The process of claim 1, wherein said interfering light beams have output powers of about 50 W/cm$^2$.

* * * * *